United States Patent
Li et al.

(10) Patent No.: US 10,158,572 B2
(45) Date of Patent: Dec. 18, 2018

(54) PATH COMPUTATION METHOD AND PATH COMPUTATION ELEMENT

(71) Applicant: ZTE CORPORATION, Shenzhen, Guangdong Province (CN)

(72) Inventors: Hui Li, Shenzhen (CN); Gang Lu, Shenzhen (CN)

(73) Assignee: XI'AN ZHONGXING NEW SOFTWARE CO., LTD (CN)

( * ) Notice: Subject to any disclaimer, the term of this patent is extended or adjusted under 35 U.S.C. 154(b) by 2 days.

(21) Appl. No.: 14/909,302

(22) PCT Filed: May 22, 2014

(86) PCT No.: PCT/CN2014/078196
§ 371 (c)(1),
(2) Date: Mar. 1, 2016

(87) PCT Pub. No.: WO2014/173353
PCT Pub. Date: Oct. 30, 2014

(65) Prior Publication Data
US 2016/0182381 A1    Jun. 23, 2016

(30) Foreign Application Priority Data
Aug. 1, 2013 (CN) .......................... 2013 1 0333176

(51) Int. Cl.
*H04L 12/803* (2013.01)
*H04L 12/64* (2006.01)
*H04L 12/715* (2013.01)

(52) U.S. Cl.
CPC ........ *H04L 47/125* (2013.01); *H04L 12/6418* (2013.01); *H04L 45/64* (2013.01); *H04L 45/04* (2013.01)

(58) Field of Classification Search
None
See application file for complete search history.

(56) References Cited

U.S. PATENT DOCUMENTS

| | | | |
|---|---|---|---|
| 2008/0151896 A1* | 6/2008 | Zhang | H04L 45/10 370/392 |
| 2009/0182894 A1* | 7/2009 | Vasseur | H04L 45/02 709/239 |
| 2012/0303998 A1* | 11/2012 | Sun | G06F 11/2041 714/4.11 |

FOREIGN PATENT DOCUMENTS

| | | |
|---|---|---|
| CN | 101984602 A | 3/2011 |
| EP | 1883181 A1 | 1/2008 |

OTHER PUBLICATIONS

Lopez, V. et al. "Path computation element in telecom networks: Recent developments and standardization activities", Optical Network Design and Modeling (ONDM), 2010 14th Conference On, IEEE, Piscataway, NJ, USA, Feb. 1, 2010 (Feb. 1, 2010), pp. 1-6, XP031648693, ISBN: 978-1-4244-5973-5 * p. 1, paragraph Section II "Path Computation Element: The Basics"—p. 3; figures 1-8 *.

(Continued)

*Primary Examiner* — James P Duffy
(74) *Attorney, Agent, or Firm* — Plumsea Law Group, LLC (57) ABSTRACT

Disclosed are a path computation method and a path computation element, applied to a system including two or more path computation elements (PCEs), and in the system, one of the PCEs is a primary PCE, and the other PCEs are secondary PCEs; the method includes: the primary PCE, after receiving a path computation request sent by a path computation client (PCC), selecting one PCE in the system to be the PCE processing this path computation request, and the selected PCE processing the path computation request. When a PCE works as the primary PCE, the PCE includes: a receiving module, configured to receive a path computation request sent by a PCC; a selecting module, configured to select one PCE in the system to be the PCE processing this (Continued)

path computation request after the receiving module receives the path computation request.

9 Claims, 5 Drawing Sheets

(56) References Cited

OTHER PUBLICATIONS

Gunreben, S. et al. "Assessment and performance evaluation of PCE-based inter-layer traffic engineering", Optical Network Design and Modeling, 2008. ONDM 2008. International Conference On, IEEE, Piscataway, NJ, USA, Mar. 12, 2008 (Mar. 12, 2008), pp. 1-6, XP031291154, ISBN: 978-3-901882-27-2 * p. 1, paragraph II "PCE-based Inter-layer Path Computation"—p. 3; figure 2 *.
The Supplementary European Search Report dated Aug. 19, 2016 in Application No. 14788783.0.
International Search Report and Written Opinion dated Aug. 20, 2014 in PCT/CN2014/078196.
Farrel, A et al., "A Path Computation Element (PCE)-Based Architecture", Network Working Group IETF RFC 4655, Aug. 31, 2006 (Aug. 31, 2006), sections 6.1 and 6.3-6.4.

* cited by examiner

PATH COMPUTATION METHOD AND PATH COMPUTATION ELEMENT

CROSS-REFERENCE TO RELATED APPLICATION(S)

This application is the U.S. National Phase application of PCT application number PCT/CN2014/078196 having a PCT filing date of May 22, 2015, which claims priority of Chinese patent application 201310333176.4 filed on Aug. 1, 2013, the disclosures of which are hereby incorporated by reference.

TECHNICAL FIELD

The present document relates to the field of path computations, and more particularly, to a path computation method and a path computation element.

BACKGROUND OF RELATED ART

The path computation element (PCE) is an entity proposed by the Internet Engineering Task Force (IETF) for computing network paths or routes and applying computation constraints in the Multi-Protocol Label Switching (MPLS)/Generalized Multi-Protocol Label Switching (GM-PLS) network. A PCE entity can be a network node, a stand-alone server, or a dedicated computing platform having the resource perception capability and multi-constraint complex computation capability.

Communication is conducted between the Path Computation Client (PCC) and the PCE and between the PCEs through the PCE Communication Protocol (PCEP). RFC5440 described the architecture of the PCEP protocol, the transmission layer of the PCEP protocol uses the Transmission Control Protocol (TCP), and two parties in the PCEP communication establish a PCEP session based on the TCP connection.

The PCE can compute paths in a single domain or multiple domains. In a single-domain domain, the Open Shortest Path First (OSPF) protocol can be used to flood the topology information and to form the Traffic Engineering Database (TED) in the local domain, and then the PCE performs a single-domain path computation based on the TED. Between the multiple domains, the Domain to Domain Routing Protocol (DDRP) can be used to flood the topology information and to form the inter-domain topology TED, and then the PCE performs a multi-domain path computation based on the TED.

If the capability of a single PCE is not sufficient to undertake a lot of path computation requests, it needs to introduce multiple PCEs, these PCEs have similar processing capabilities. If it needs to improve the performance of path computation in the network, these PCEs need to balance loads of a large number of path computation requests, that is, each PCE has to undertake part of the path computation tasks to achieve the purpose of load balancing. RFC4655 gives the concept of PCE load balancing, that is, different PCEs are selected to compute the path to achieve the purpose of load balancing, but do not provide an appropriate method.

SUMMARY

The embodiment of the present document provides a path computation method and a path computation element in order to overcome the defects in the related art that the load balancing between path computation elements cannot be achieved.

The embodiment of the present document provides a path computation method, applied to a system comprising two or more path computation elements (PCEs), in the system, one of the path computation elements is a primary PCE, and the other PCEs are secondary PCEs; the method comprises:

after receiving a path computation request sent by a path computation client (PCC), the primary PCE selecting one PCE in the system to be a PCE processing this path computation request, and the selected PCE processing the path computation request.

Alternatively, said selecting one PCE in the system to be a PCE processing this path computation request comprises:

the primary PCE selecting a PCE currently with a minimum number of processed path computation requests to be the PCE processing this path computation request based on a recorded number of path computation requests processed by each PCE; and/or, the primary PCE selecting a PCE currently having a highest priority to be the PCE processing this path computation request based on priority information of each PCE; and/or, randomly selecting one PCE to be the PCE processing this path computation request.

Alternatively, said selecting a PCE currently with a minimum number of processed path computation requests to be the PCE processing this path computation request comprises:

in all the PCEs other than a PCE selected last time, selecting a PCE currently with a minimum number of processed path computation requests to be the PCE processing this path computation request.

Alternatively,

Said the selected PCE processing the path computation request comprises:

when the selected PCE is a secondary PCE, the primary PCE forwarding this path computation request to the selected PCE through a PCE Communication Protocol (PCEP) session established between the primary PCE and the selected PCE, and the selected PCE performing path computation.

Alternatively,

Said the selected PCE processing the path computation request comprises:

when the selected PCE is a secondary PCE, the primary PCE notifying the PCC of path information of the selected PCE;

the PCC initiating a path computation request to the selected PCE based on the obtained path information of the selected PCE; and the selected PCE performing path computation after receiving the path computation request.

Alternatively,

Said the selected PCE processing the path computation request comprises:

when the selected PCE is the primary PCE, the primary PCE directly performing path computation.

Alternatively, the method further comprises:

the selected PCE returning the computed path information back to the primary PCE, and the primary PCE returning the path information back to the PCC.

Alternatively, the method further comprises:

the selected PCE returning the computed path information back to the PCC after completing the path computation.

Accordingly, the embodiment of the present document further provides a path computation element (PCE), applied to a system comprising one primary PCE and more than one secondary PCE, when the PCE works as the primary PCE, it comprises: a receiving module and a selecting module, wherein, the receiving module is configured to: receive a path computation request sent by a path computation client (PCC); and the selecting module is configured to: select one PCE in the system to be a PCE processing this path computation request after the receiving module receives the path computation request.

Alternatively, the selecting module selects one PCE in the system to be the PCE processing this path computation request through one of the following ways:

the selecting module being configured to select a PCE currently with a minimum number of processed path computation requests to be the PCE processing this path computation request in accordance with a recorded number of path computation requests processed by each PCE; and/or, the selecting module being configured to select a PCE currently having a highest priority to be the PCE processing this path computation request based on priority information of each PCE; and/or, the selecting module being configured to randomly select one PCE to be the PCE processing this path computation request.

Alternatively, the selecting module selects a PCE currently with a minimal number of processed path computation requests to be the PCE processing this path computation request through the following way:

the selecting module being configured to select a PCE currently with the minimum number of processed path computation requests from all the PCEs other than a PCE selected last time to be the PCE processing this path computation request.

Alternatively, when the PCE works as the primary PCE and the PCE selected by the selecting module is a secondary PCE, it further comprises a sending module:

the sending module is configured to forward this path computation request to the PCE selected by the selecting module through a PCE communication protocol (PCEP) session established between the primary PCE and the PCE selected by the selecting module;

when the PCE works as the PCE selected by the selecting module, it further comprises:

a processing module, configured to perform path computation after receiving a path computation request sent by the primary PCE.

Alternatively, when the PCE works as the primary PCE and the PCE selected by the selecting module is a secondary PCE, it further comprises a sending module:

the sending module is configured to notify the PCC of path information of the PCE selected by the selecting module;

when the PCE is the PCE selected by the selecting module, it further comprises:

a processing module, configured to perform path computation after receiving the path computation request sent by the PCC based on the path information of the present PCE sent by the primary PCE.

Alternatively, when the PCE is the primary PCE and the PCE selected by the selecting module is the primary PCE, it further comprises:

a processing module, configured to directly perform path computation.

Alternatively, when the PCE works as the PCE selected by the selecting module, it further comprises:

a sending module, configured to return the computed path information back to the primary PCE; and the sending module in the primary PCE is further configured to return the path information sent from the PCE back to the PCC.

Alternatively, when the PCE works as the PCE selected by the selecting module, it further comprises:

a sending module, configured to return the computed path information back to the PCC.

The embodiment of the present document uses the architecture of the primary and secondary PCEs, the primary PCE decides which PCE finally processes the path computation request, so as to achieve the load balancing of path computation between the PCEs. The architecture of the embodiment of the present document is relatively simple and easy to implement the PCE deployment; and it adopts the way of using the primary PCE to make decisions, so that the load balancing algorithm is relatively clear and the implementation complexity is relatively low.

BRIEF DESCRIPTION OF THE DRAWINGS

FIG. 2 (*a*) and FIG. 2 (*b*) are respectively schematic diagrams of two implementation processes of the path computation method in accordance with an embodiment of the present document;

PREFERRED EMBODIMENTS OF THE INVENTION

Hereinafter, in conjunction with the accompanying drawings, the embodiments of the present document will be described in detail. It should be noted that in the case of no conflict, embodiments and features in the embodiments of the present application may be combined arbitrarily with each other.

In the present embodiment, based on an associated multiple-path computation element system, it configures one of the PCEs as the primary PCE through the management plane, and the other PCEs as secondary PCEs. The PCC selects the primary PCE to perform the path computation, and the primary PCE decides whether to process the path computation request by itself or to process the path computation request by another secondary PCE, so as to achieve the load balancing of path computation between multiple PCEs.

Figure 1:
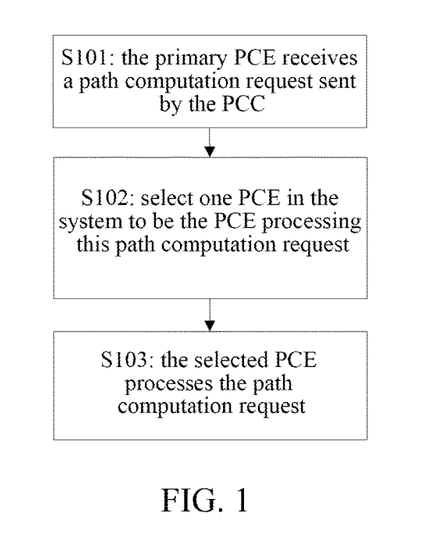
FIG. 1 is a flow chart of a path computation method in accordance with an embodiment of the present document.

In the present embodiment, as shown in FIG. 1, a path computation method is applied to a system comprising two or more PCEs, and in the system, one of the path computation elements is the primary PCE, the other PCEs are secondary PCEs; the method comprises:

in S101, the primary PCE receives a path computation request sent by the PCC;

in S102, it is to select a PCE in the system to be the PCE processing this path computation request;

in S103, the selected PCE processes the path computation request.

Assume that there are N+1 external PCEs, respectively PCEm, PCEs (1), ..., PCEs (N), in a domain;

wherein, the PCEm is the primary PCE, and the PCEs (1), ..., the PCEs (N) are secondary PCEs; the PCC is a control plane node in the domain.

In the present embodiment, the path computation method comprises the following steps:

in step 1, the management plane configures information of the primary PCE (PCEm) to the PCC, and the PCC obtains information of the primary PCE node through the automatic discovery information, and establishes a PCEP session with the PCEm;

in step 2, the PCC is ready to request the PCEs in the domain for computing the intra-domain path or inter-domain path, and sends the path computation request PCReq to the PCEm for processing;

in step 3, after receiving the path computation request, the PCEm selects a PCE (noted as PCEd, the PCEd is PCEs (i) (1≤i≤N) or PCEm) from the PCEm and the PCEs (1), ..., PCEs (N) to be the PCE selected in this load balancing for process this path computation request;

the PCEm selects the PCEd from the PCEm and the PCEs (1), ..., the PCEs (N) in any one of the following ways:

the first way: the PCEm records the situation of each PCE processing the path computation request PCReq, the PCEm selects one PCE with the minimum number of processed path computation requests from all the PCEs other than the one selected last time as the PCEd by means of rotating when there is a new path computation request coming in;

the second way: it is to configure each PCE with a priority through the management plane, and the PCEm selects the PCE having the highest priority in the currently available PCEs to be the PCEd based on a "from high to low" priority principle;

the third way: the PCEm randomly selects a PCE to be the PCEd;

the abovementioned ways may be used alone or in combination thereof. For example, when receiving the path computation request at the first time, the PCEm selects the PCE with the highest priority from the currently available PCEs based on the priority information, if there are 2 or more PCEs with the highest priority at the same time, it may randomly select one of the 2 or more PCEs with the highest priority as a finally-selected PCEd. The subsequent path computation request can be rotated based on the first selection result, and the PCE having the highest priority PCE is selected from the PCEs other than the PCE selected last time to be the PCEd, if there are still two or more PCEs with the highest priority at this time, it still can continue to randomly select one PCE within the same priority range to be the PCEd.

Figure 2A:
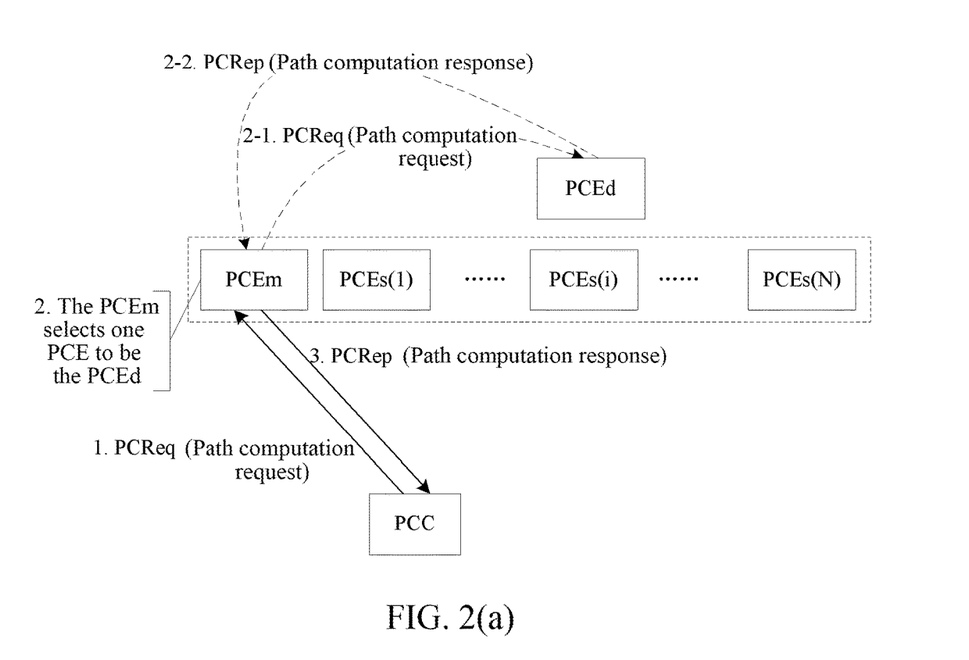
Figure 2B:
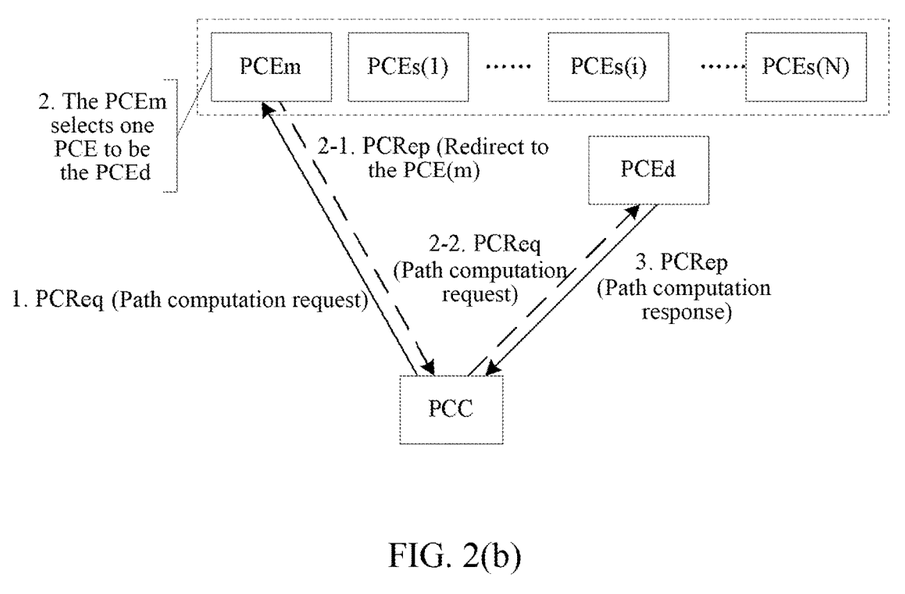

In step 4, the PCEm sends the path computation request PCReq to the PCEd, so that the PCEd processes the path computation;

The PCEm sends the path computation request to the PCEd by using any one of the following ways:

the first way: a PCEP session is established between the PCEm and the PCEs (1), ..., PCEs (N); after the PCEm selects one PCE to be the PCEd, if the PCEd is the PCEm itself, the PCEm directly performs the path computation; otherwise, the PCEm forwards the path computation request to the appropriate PCEd to process the path computation through the PCEP session, as shown in FIG. 2 (a);

the second way: after the PCEm selects one PCE to be the PCEd, if the PCEd is the PCEm itself, the PCEm directly performs the path computation; otherwise, it notifies the PCC of the PCEd's path information (including the PCEd's IP address and port information) through a PCRep response, and the PCC initiates a path computation request to the PCEd based on the obtained PCEd information, as shown in FIG. 2 (b);

in step 5, if the first way is selected in the step 4 to send the path computation request, the PCEd returns the computed path information back to the PCEm through the PCRep response, the PCEm then returns the computed path information back to the PCC, as shown in FIG. 2 (a); if the second way is used in the step 4 to send the path computation request, then the PCEd directly returns the computed path information back to the PCC through the PCRep response, as shown in FIG. 2 (b).

In summary, with the abovementioned method, load balancing of the path computation requests can be performed for a plurality of PCEs in one domain.

To more clearly describe the embodiments of the present document, in the following, a few application examples are used to describe accordingly.

The First Application Example

This example describes the situation of the primary PCE selecting one PCE to forward the PCReq by means of rotating.

Figure 3:
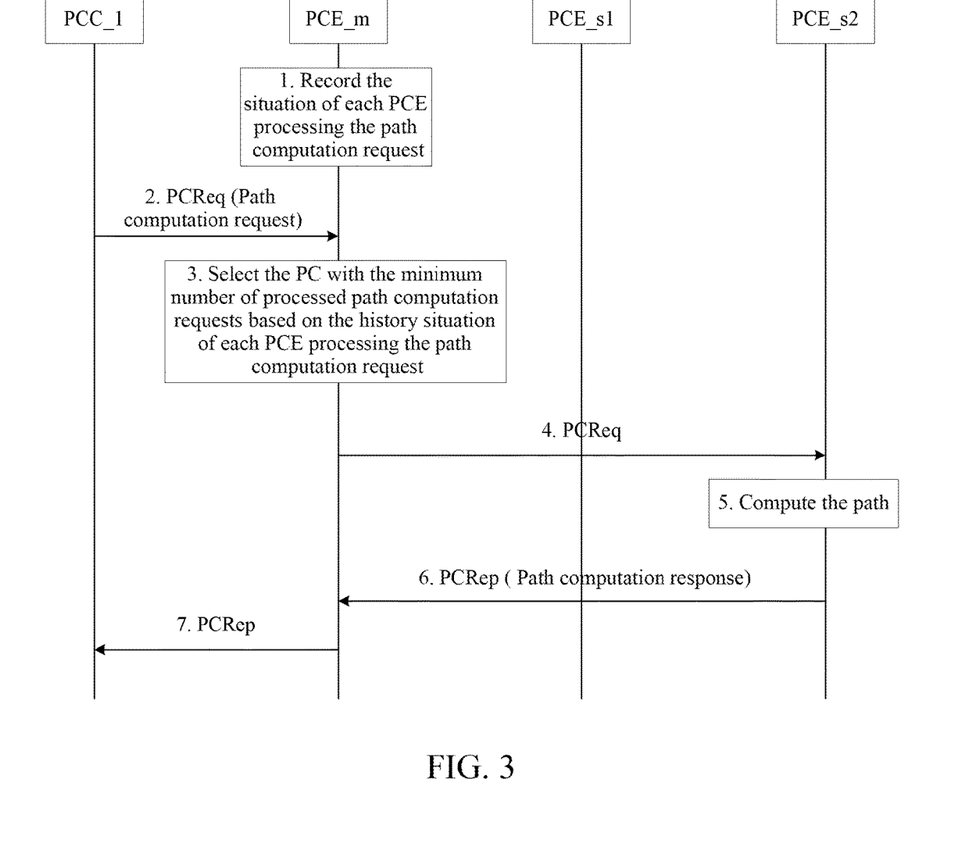
FIG. 3 is a flow chart of a first application example in accordance with an embodiment of the present document.

FIG. 3 provides three PCEs (respectively PCE_m, PCE_s1, PCE_s2) in a domain, wherein, the PCE_m is the primary PCE, and the PCE_s1 and the PCE_s2 are secondary PCEs; the PCC_1 is one control plane node in the domain. The PCC_1 sends a path computation request PCReq to the PCE, and the process is as follows:

(1) the PCEm records the situation of each PCE processing the path computation request PCReq;

(2) the PCC_1 sends the path computation request to the PCE_m;

(3) assuming that the PCE_m has processed 10 path computation requests, the PCE_s1 has processed 8 path computation requests, and the PCE_s2 has only processed 5 path computation requests; then the PCE_m may use the following way to select the PCE: the PCE_m selects the PCE with the minimum number of processed path computation requests, such as the PCE_s2, to be the PCEd selected for the load balancing;

(4) the PCE_m forwards the path computation request PCReq to the PCE_s2;

(5) the PCE_s2 performs the path computation;

(6) after the path computation completes, the PCE_s2 returns the path computation result back to the PCE_m through the PCRep response;

(7) the PCE_m returns the path computation result to the PCC_1 through the PCRep response.

The Second Application Example

This example describes the situation of the primary PCE selecting one PCE to process the PCReq through the priority.

Figure 4:
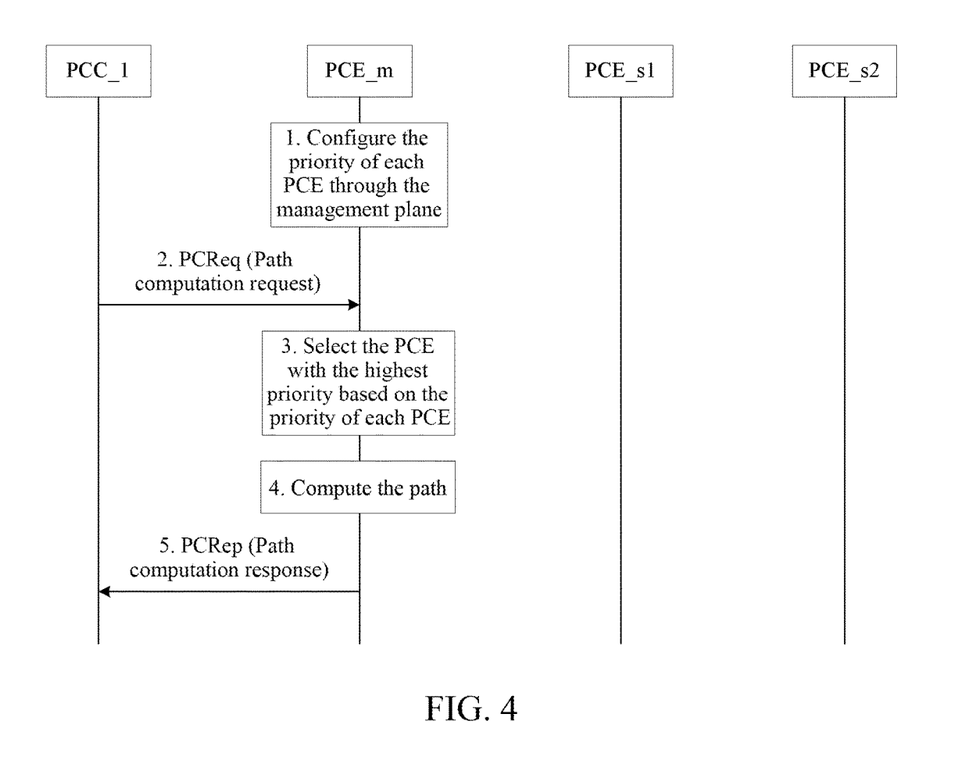
FIG. 4 is a flow chart of a second application example in accordance with an embodiment of the present document.

FIG. 4 provides three PCEs (respectively PCE_m, PCE_s1, PCE_s2) in one domain, wherein, the PCE_m is the primary PCE, and the PCE_s1 and the PCE_s2 are secondary PCEs; the PCC_1 is one control plane node in the domain. The PCC_1 sends a path computation request PCReq to the PCE, and the process is as follows:

(1) it is to configure the priority of each PCE through the management plane in advance;

(2) the PCC_1 sends the path computation request to the PCE_m;

(3) assuming that the PCE_m has the high priority, the PCE_s1 has the medium priority, and the PCE_s2 has the low priority; then the PCE_m may use the following way to select the PCE: the PCE_m selects the PCE with the highest priority, such as the PCE_m, to be the PCEd selected for the load balancing;

(4) because the selected PCE is the PCE_m itself, the PCE_m performs the path computation;

(5) After the path computation completes, the PCE_m returns the path computation result back to the PCC_1 through the PCRep response.

The Third Application Example

The present embodiment describes the situation of the primary PCE selecting a PCE through a random way and redirects the PCReq.

Figure 5:
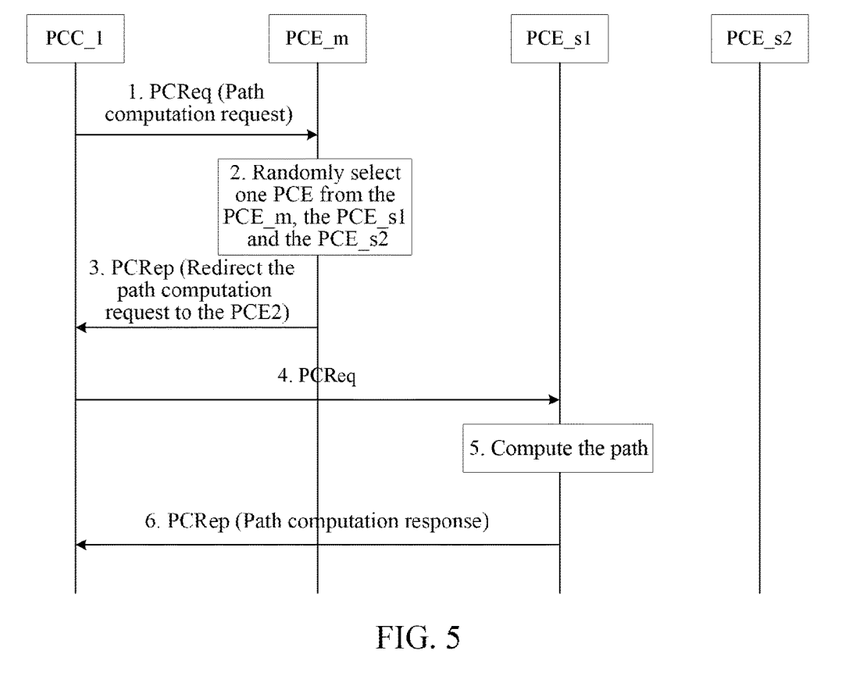
FIG. 5 is a flow chart of a third application example in accordance with an embodiment of the present document.

FIG. 5 provides three PCEs (respectively PCE_m, PCE_s1, PCE_s2) in one domain, wherein, the PCE_m is the primary PCE, and the PCE_s1 and the PCE_s2 are secondary PCEs; the PCC_1 is one control plane node in the domain. The PCC_1 sends the path computation request PCReq to the PCE, the process is as follows:

(1) the PCC_1 sends a path computation request to the PCE_m;

(2) the PCE_m randomly selects a PCE, such as PCE_s1, to be the PCEd selected for load balancing;

(3) the PCE_m returns the path information of the PCEd processing the path computation request back to the PCC_1 through the PCRep response;

(4) the PCC_1 resends the path computation request to the PCE_s1 based on the PCEd path information carried in the PCRep response message sent by the PCE_m;

(5) the PCE_s1 performs the path computation;

(6) after the path computation completes, the PCE_s1 returns the path computation result back to the PCC1 through the PCRep response.

Figure 6:
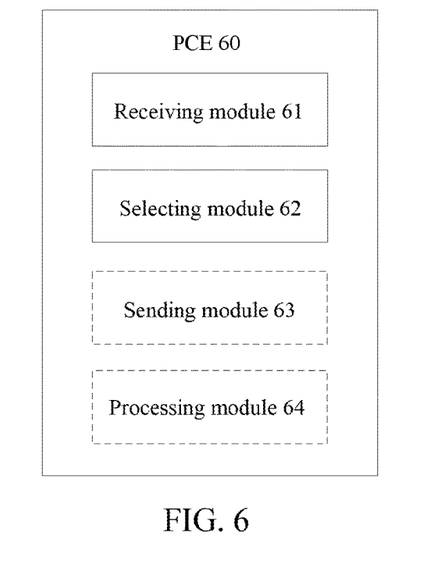
FIG. 6 is a schematic diagram of the structure of a path computation unit (PCE) in accordance with an embodiment of the present document.

Accordingly, as shown in FIG. 6, the embodiment of the present document further provides a PCE 60, applied to a system consisting of one primary PCE and more than one secondary PCEs, and when the PCE is the primary PCE, it comprises:

a receiving module 61, which is configured to receive a path computation request sent by the PCC;

a selecting module 62, which is configured to select one PCE in the system to be the PCE processing this path computation request when the receiving module receives the path computation request.

Alternatively, the selecting module 62 selects one PCE in the system to be the PCE processing this path computation request through the following way:

the selecting module 62 being configured to select the PCE currently with the minimum number of processed path computation requests to be the PCE processing this path computation request in accordance with the recorded number of path computation requests processed by each PCE; and/or, the selecting module 62 being configured to select the PCE currently having the highest priority to be the PCE processing this path computation request based on the priority information of each PCE; and/or, the selecting module 62 being configured to randomly select one PCE to be the PCE processing this path computation request.

Alternatively, the selecting module 62 selects the PCE currently with the minimal number of processed path computation requests to be the PCE processing this path computation request through the following way:

the selecting module 62 being configured to select the PCE currently with the minimum number of processed path computation requests from all the PCEs other than the PCE selected last time to be the PCE processing this path computation request.

Alternatively, when the PCE works as the primary PCE and the PCE selected by the selecting module is a secondary PCE, it further comprises a sending module 63:

the sending module 63 is configured to forward this path computation request to the PCE selected by the selecting module through the PCE communication protocol (PCEP) session established between the primary PCE and the PCE selected by the selecting module;

when the PCE works as the PCE selected by the selecting module, it further comprises:

a processing module 64, configured to perform the path computation after receiving a path computation request sent by the primary PCE.

Alternatively, when the PCE works as the primary PCE and the PCE selected by the selecting module is a secondary PCE, it further comprises a sending module 63:

the sending module 63 is configured to notify the PCC of the path information of the PCE selected by the selecting module;

when the PCE is the PCE selected by the selecting module, it further comprises:

a processing module 64, configured to perform the path computation after receiving the path computation request sent by the PCC based on the path information of the present PCE sent by the primary PCE.

Alternatively, when the PCE is the primary PCE and the PCE selected by the selecting module is the primary PCE, it further comprises:

A processing module 64, configured to directly perform the path computation.

Alternatively, when the PCE works as the PCE selected by the selecting module, it further comprises:

a sending module 63, configured to return the computed path information back to the primary PCE; and the sending module in the primary PCE is further configured to return the path information sent from the PCE back to the PCC.

Alternatively, when the PCE works as the PCE selected by the selecting module, it further comprises:

a sending module 63, configured to return the computed path information back to the PCC.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

The above description is only preferred embodiments of the present document and is not used to limit the protection scope of the present document. According to the summary of the present document, there are also a variety of other embodiments, and without departing from the spirit and essence of the present document, those skilled in the art can make various appropriate changes and modifications based on the present document, and any changes, equivalent replacements, or improvements made within the spirit and principles of the present document should be included within the protection scope of the present document.

INDUSTRIAL APPLICABILITY

The embodiment of the present document uses the architecture of the primary and secondary PCEs, the primary PCE decides which PCE finally processes the path computation request, in order to achieve the load balancing of path computation between the PCEs. The architecture of the embodiment of the present document is relatively simple and easy to implement the PCE deployment; and it adopts the way of using the primary PCE to make decisions, so that the load balancing algorithm is relatively clear and the implementation complexity is relatively low.

What is claimed is:

1. A path computation method, applied to a system comprising two or more path computation elements (PCEs), wherein in the system, one of the path computation elements is configured as the primary PCE through a management plane, other PCEs are configured as secondary PCEs, and information of the primary PCE is configured to a path computation client (PCC) which then establishes a session with the primary PCE, and sends a path computation request to the one PCE configured as the primary PCE through the session when a path is needed; the method comprises:
    after receiving a path computation request sent by the PCC, the primary PCE selecting one PCE in the system to be a PCE processing this path computation request, and the selected PCE processing the path computation request;
    the primary PCE receiving a path computation result from the selected PCE, and sending the path computation result to the PCC;
    wherein the selected PCE processing the path computation request comprises:
        when the selected PCE is the primary PCE, the primary PCE directly performing path computation.

2. The method of claim 1, wherein,
said selecting one PCE in the system to be a PCE processing this path computation request comprises:
the primary PCE selecting a PCE currently with a minimum number of processed path computation requests to be the PCE processing this path computation request based on a recorded number of path computation requests processed by each PCE; or,
the primary PCE selecting a PCE currently having a highest priority to be the PCE processing this path computation request based on priority information of each PCE; or,
randomly selecting one PCE to be the PCE processing this path computation request.

3. The method of claim 1, wherein,
said selecting one PCE in the system to be a PCE processing this path computation request comprises:
based on a recorded number of path computation requests processed by each PCE, in all the PCEs other than a PCE selected last time, the primary PCE selecting a PCE currently with a minimum number of processed path computation requests to be the PCE processing this path computation request.

4. The method of claim 1, wherein,
the selected PCE processing the path computation request comprises:
when the selected PCE is a secondary PCE, the primary PCE forwarding this path computation request to the selected PCE through a PCE Communication Protocol (PCEP) session established between the primary PCE and the selected PCE, and the selected PCE performing path computation.

5. The method of claim 1, wherein,
the selected PCE processing the path computation request comprises:
when the selected PCE is a secondary PCE, the primary PCE notifying the PCC of path information of the selected PCE;
the PCC initiating a path computation request to the selected PCE based on the obtained path information of the selected PCE; and
the selected PCE performing path computation after receiving the path computation request.

6. A path computation element (PCE), applied to a system comprising one primary PCE and more than one secondary PCE, wherein the PCE is configured as the primary PCE through a management plane, the primary PCE comprising:
a receiving module and a selecting module, wherein,
    the receiving module is configured to: receive a path computation request sent by a path computation client (PCC), which has established a session with the primary PCE, through the session when a path is needed; and
    the selecting module is configured to: select the primary PCE or one of the secondary PCEs in the system to be a PCE processing this path computation request after the receiving module receives the path computation request; and
wherein the primary PCE further comprises a sending module configured to notify the PCC of a path computation result from the PCE selected by the selecting module;
the primary PCE further comprising a processing module, configured to directly perform path computation requests when the primary PCE is selected by the selecting module to be the PCE processing the requests.

7. The path computation element of claim 6, wherein,
the selecting module selects one PCE in the system to be the PCE processing this path computation request in one of the following ways:
the selecting module being configured to select a PCE currently with a minimum number of processed path computation requests to be the PCE processing this path computation request in accordance with a recorded number of path computation requests processed by each PCE; or
the selecting module being configured to select a PCE currently having a highest priority to be the PCE processing this path computation request based on priority information of each PCE; or the selecting module being configured to randomly select one PCE to be the PCE processing this path computation request.

8. The path computation element of claim 6, wherein, the selecting module selects one PCE in the system to be the PCE processing this path computation request in the following way:

in accordance with a recorded number of path computation requests processed by each PCE, the selecting module being configured to select a PCE currently with a minimum number of processed path computation requests from all the PCEs other than a PCE selected last time to be the PCE processing this path computation request.

9. The path computation element of claim 6, wherein, the sending module is configured to, when the PCE selected by the selecting module to process this path computation request is a secondary PCE, forward this path computation request to the PCE selected by the selecting module through a PCE communication protocol (PCEP) session established between the primary PCE and the PCE selected by the selecting module.

* * * * *